United States Patent
Ringholz et al.

(10) Patent No.: US 8,139,047 B2
(45) Date of Patent: Mar. 20, 2012

(54) INPUT PEN FOR A TOUCH-SENSITIVE MEDICAL MONITOR

(75) Inventors: Maria Ringholz, Erlangen (DE); Petra Osthues, München (DE)

(73) Assignee: BrainLAB AG, Feldkirchen (DE)

( * ) Notice: Subject to any disclaimer, the term of this patent is extended or adjusted under 35 U.S.C. 154(b) by 761 days.

(21) Appl. No.: 12/175,873

(22) Filed: Jul. 18, 2008

(65) Prior Publication Data

US 2009/0020344 A1    Jan. 22, 2009

Related U.S. Application Data

(60) Provisional application No. 60/957,261, filed on Aug. 22, 2007.

(30) Foreign Application Priority Data

Jul. 20, 2007  (EP) .................................. 07014275

(51) Int. Cl.
*G09G 5/00* (2006.01)
*G06F 3/033* (2006.01)

(52) U.S. Cl. ......... 345/176; 345/175; 345/179; 715/203

(58) Field of Classification Search .......... 345/157–159, 345/165–166, 169, 175, 179, 207, 176; 178/19.05; 715/203

See application file for complete search history.

(56) References Cited

U.S. PATENT DOCUMENTS

| | | | | |
|---|---|---|---|---|
| 5,600,348 | A * | 2/1997 | Bartholow et al. | 345/180 |
| 5,625,833 | A * | 4/1997 | Levine et al. | 715/203 |
| 6,441,362 | B1 * | 8/2002 | Ogawa | 250/221 |
| 7,109,700 | B2 * | 9/2006 | Fazzina | 324/115 |
| 7,310,091 | B2 * | 12/2007 | Liu et al. | 345/179 |
| 2002/0041290 | A1 * | 4/2002 | LeKuch et al. | 345/775 |
| 2004/0201579 | A1 * | 10/2004 | Graham | 345/175 |
| 2005/0057535 | A1 | 3/2005 | Liu et al. | |
| 2006/0001654 | A1 * | 1/2006 | Smits | 345/176 |
| 2006/0028457 | A1 * | 2/2006 | Burns | 345/179 |
| 2007/0106931 | A1 * | 5/2007 | Vartiainen et al. | 715/512 |

* cited by examiner

*Primary Examiner* — Quan-Zhen Wang
*Assistant Examiner* — Michael J Eurice
(74) *Attorney, Agent, or Firm* — Renner, Otto, Boisselle & Sklar, LLP

(57) ABSTRACT

The invention relates to an input pen for a touch-sensitive medical monitor, including: a grip portion, and an input portion, wherein the input portion includes one-dimensional and two-dimensional monitor contact sections.

17 Claims, 2 Drawing Sheets

INPUT PEN FOR A TOUCH-SENSITIVE MEDICAL MONITOR

RELATED APPLICATION DATA

This application claims priority of U.S. Provisional Application No. 60/957,261 filed on Aug. 22, 2007, and EP 07014275 filed on Jul. 20, 2007, which are incorporated herein by reference in their entirety.

FIELD OF THE INVENTION

The invention relates to generally to input devices and, more particularly, to an input pen for a touch-sensitive medical monitor.

BACKGROUND OF THE INVENTION

Medical image data can be generated two-dimensionally or three-dimensionally using medical imaging methods (for example, computer tomography, nuclear spin tomography, or x-ray apparatus). The image data is increasingly stored as digital image data or digital image data sets and made available to the treatment staff in an image-assisted treatment.

Image-assisted treatment is made possible using monitors or using digital film viewers (light boxes), and in further developments of this technology, the user has the option of altering the representation of the image or the image data themselves using inputs on the monitor or light box.

If touch-sensitive monitors (monitors and digital film viewers or light boxes are collectively referred to herein as "monitors") are used, a user can provide an input via the screen.

Inputs can be made using the hands and/or fingers, or also by using input pens. Using an input pen to enter commands is described in WO 02/00297 A2. In this disclosure, a simple touch pen is used to input data on a touch-sensitive screen. Such methods are also used to input data on computers with touch-sensitive screens or on PDAs.

SUMMARY OF THE INVENTION

An input pen in accordance with the invention is configured for inputting data on a touch-sensitive medical monitor. Herein it will be referred to as a "medical input pen," "medical monitor input pen," or "input pen." An input pen in accordance with the invention may include a grip portion and an input portion, wherein the input portion includes one-dimensional and two-dimensional monitor contact sections. In other words, an "input tip" of the input pen is configured with a shape that multiplies the inputting options. In accordance with the invention, the input portion acquires a shape that allows inputs that can be variously identified and interpreted depending on their position of contact on the monitor.

Configuring the input pen in accordance with the invention works well with monitors that have a so-called "multi-touch" function. Such monitors can detect a number of contact processes simultaneously and can distinguish punctual, linear, or planar contacts. Using a single input pen configured in accordance with the invention, it is possible to generate such one-dimensional and multi-dimensional contacts to significantly increase the number of possible inputs. An image shown on the monitor can be selected and deselected by an image contact using the one-dimensional contact portion of the input pen, while a different image contact using a multi-dimensional portion of the input pen and a subsequent contact movement may cause the image to be shifted. The interpretation of the respective contact may be stored in a data processing system for controlling the monitor, and the desired inputs can be made in a very simple and uncomplicated way using a single input pen.

A one-dimensional contact section can be configured to be punctual or can enable a punctual contact with the monitor. A two-dimensional contact section can be configured to be linear and/or planar or can enable a linear and/or planar contact with the monitor.

Wherever "contact with the monitor" is mentioned herein, this term includes embodiments in which the monitor registers actual contacts on its surface, but also other embodiments in which light is scanned in the surface of the monitor (for example, by an infrared light grid).

In one exemplary version of the input pen in accordance with the invention, the input portion comprises the one-dimensional and two-dimensional contact sections at particular locations. The input portion also can be variable or changing in shape to form one-dimensional or two-dimensional contact sections.

Examples of the latter variation include input portions that are variable in shape, wherein flexible contact sections may be provided that flexibly change their shape from a one-dimensional state to a two-dimensional state or vice versa. One example may be a convex bulge on the input pen, made of a flexible material. Another alternative may be a spherical shape. If a spherical shape is used, the sphere may first trigger a punctual contact and, when pressed harder, may trigger a circular planar contact. In another example, the input portion may exhibit a cylindrical outer shape and comprise a flexible material. In this example, a linear input may be made when it is lightly touching, and a rectangular input contact may be made when it is pressed harder.

Another way in which shape changes can change the contact section may be to form the input portion to be mechanically variable in shape, wherein the input portion comprises parts that can be moved with respect to each other and can be biased elastically with respect to each other. These parts, individually or together, can form the contact section.

In accordance with one exemplary application of the invention, a planar sterility barrier may be arranged between the grip portion and the input portion. The sterility barrier may be arranged at the distal end of the grip portion, and may project transversely from the body of the pen on all sides. By forming the input pen from a material that is easy to sterilize, such an input pen can be kept reproducibly sterile (i.e., can be cleaned, disinfected and sterilized after use). If a sterility barrier as mentioned above is provided between the grip portion and the input portion, the grip portion will remain sterile during use, while at the other end (i.e., the input portion) it may become non-sterile due to non-sterile contacts with a monitor. The portion of the input pen that the operator grips thus remains sterile, and so does the operator.

Another possible type of input that can be provided by an input pen configured in accordance with the invention is a rotational contact. Specifically, a signal emitter can be arranged on the input portion of the pen and a signal receiver can be arranged on the monitor that identifies rotational changes in the position of the input portion from the signals received from the signal emitter. Such a configuration also can increase the range of inputs.

The signal emitter can be a light emitter (for example, an infrared light emitter) and the signal receiver can be a light-sensitive element. One example of such a light-sensitive element is a group of infrared light receivers that may be arranged around the edge of the monitor and serve to determine a contact with the touch-sensitive monitor. In this example, a feature of a touch-sensitive monitor that operates using light scanning may be used in two ways: (1) for identifying "contacts" and (2) for identifying a rotational movement of the input pen.

Another exemplary configuration in accordance with the invention may be designed such that a reflector can be arranged on the input portion of the input pen, and at least one signal emitter and at least one signal receiver may be arranged on the monitor. The signal receiver may identify rotational changes in the position of the input portion from the signals received from the reflector. Such rotational changes may include rotations made substantially around the axis of the pen. In this example, the signal emitter also can comprise a light emitter (for example, an infrared light emitter) and the signal receiver can comprise a light-sensitive element. The light sensitive element may include a group of infrared light receivers that are arranged around the edge of the monitor and serve to determine a contact with the touch-sensitive monitor.

BRIEF DESCRIPTION OF THE DRAWINGS

The forgoing and other features of the invention are hereinafter discussed with reference to the figures.

DETAILED DESCRIPTION

Figure 1A:
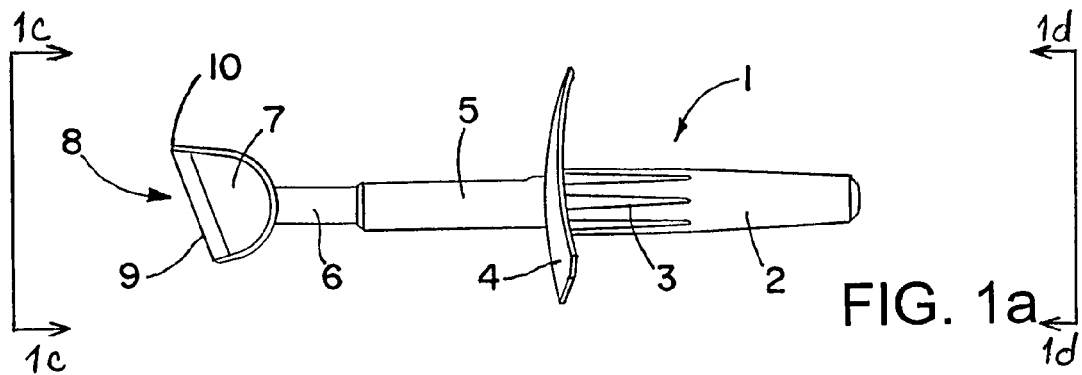
FIGS. 1a through 1d show an exemplary input pen in accordance with the invention, in various projected views.
Figure 1B:
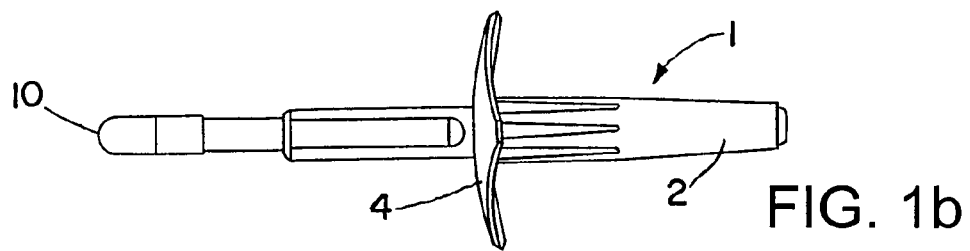
Figure 1C:
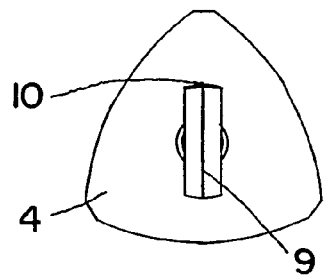
Figure 1D:
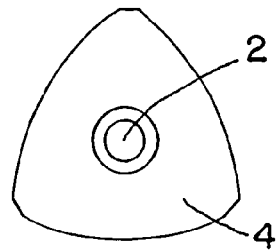
Figure 2:
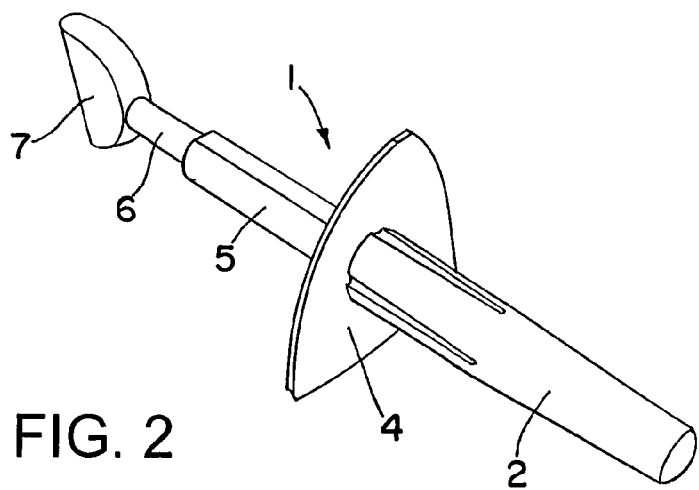
FIGS. 2 and 3 show two oblique views of the input pen of FIG. 1.
Figure 3:
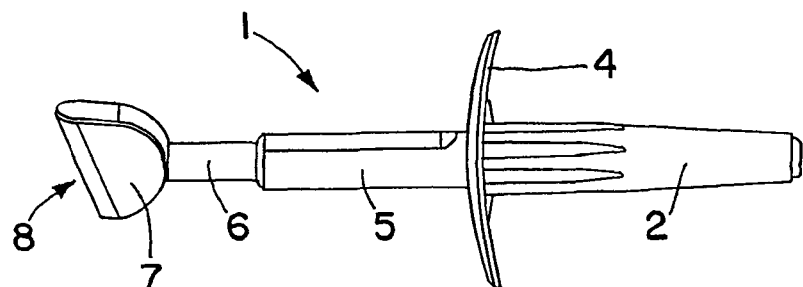

An exemplary input pen in accordance with the invention, shown in FIGS. 1a to 1d, bears the reference sign 1. It has a grip portion 2 with gripping grooves 3. A front portion of the input pen is separated from the grip portion 2 by a sterility barrier 4, which projects from a body of the pen as a triangular planar body that is rounded outwards. The sterility barrier 4 keeps the grip portion 2 sterilely separate from the front portion of the pen (which may comprise extensions 5 and 6, opposite the sterility barrier 4). The extensions 5 and 6 can be integrally formed as a single part having a fixed length, however also it is possible to configure the pen and/or extensions to have a variable length. The extension 6 can be telescopically moved within the extension 5 and can be fixed to a length (for example, by a rotational lock—not shown).

An input portion 7 of the pen may be connected to the extension 6 and the input portion's front end may comprise a monitor contact portion 8. In another example in accordance with the invention, an input portion 7 also can be directly connected to the grip portion 2 and/or the barrier 4. The contact portion 8 may include different monitor contact sections, and FIGS. 1a-1d show a tip 10 that lies at the upper end of the input portion 7. In the example, a contact section 9 may be formed substantially cylindrically, and may extend obliquely backwards and downwards from the tip 10.

The input portion 7 forms the contact end of the input pen and when the tip 10 touches a monitor, this contact generates a punctual or very small planar contact point. A linear or planar point contact can be generated using the outer side of the cylindrical contact section 9. In this manner, different inputs intended to produce different results in terms of representation of an image and/or image processing can be made using the same input pen. A sectional image from a CT patient scan can be displayed on the monitor, and by touching the monitor in the image region, the sectional image may be selected or deselected. If, however, the tip—once touching—is moved by a certain distance over the monitor, this movement can be interpreted as a command that causes various sectional image planes to be scrolled. If a linear or planar input is made using the same input pen (for example, by the contact section 9) this input is registered and another manipulation can be initiated when the planar input is moved (for example, the image can be shifted). In accordance with the invention, multiple functions of touch-sensitive screens can be initiated or controlled using a single input pen.

Additionally, it is possible to simultaneously use a number of the input pens in accordance with the invention. For example, a measurement may be taken using two input pens making two contacts.

Figure 4:
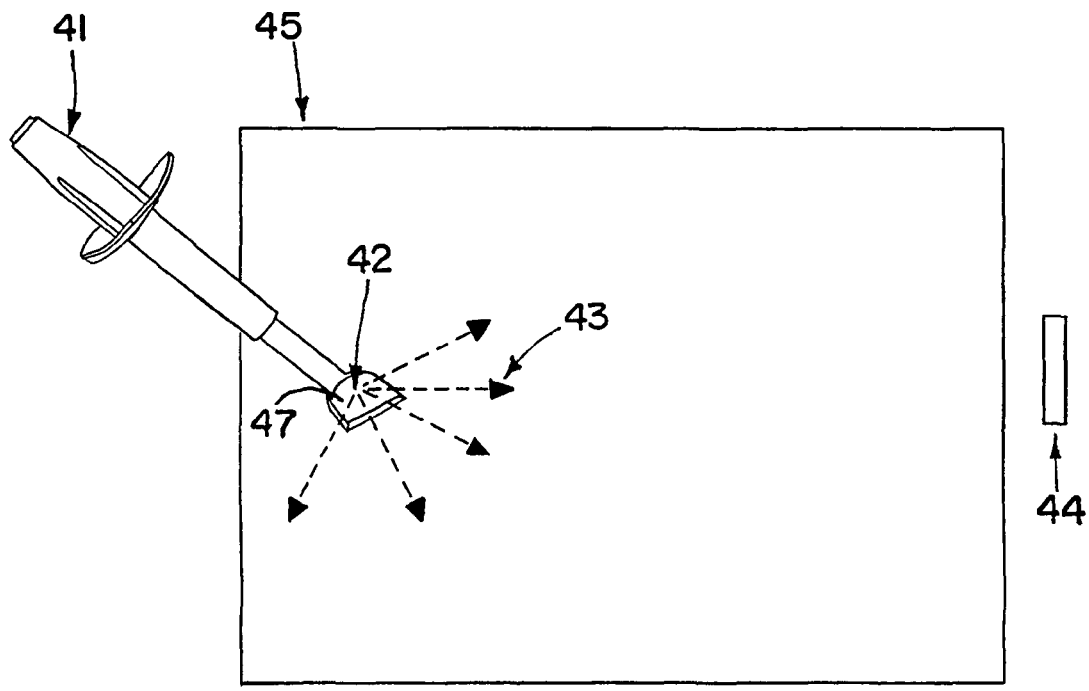
FIG. 4 shows the input pen of FIG. 1 wherein the rotation of the input pen may be detected.

Another example in accordance with the invention may be using an input pen that is equipped with a signal emitter or transmitter. With such a configuration, it is possible to generate a rotating input, as shown in FIG. 4. The input portion 47 of the input pen 41 may comprise a light source 42 (for example, an infrared light transmitter) that emits infrared light as shown by arrows 43. The light transmitter 42 on the input portion 47 then may signal whether the input pen 41 is being rotated. To this end, a signal receiver 44 may be arranged on a monitor 45. It is also possible to arrange a number of signal receivers 44 around an edge of the monitor 45, and the signal receivers 44 can simultaneously act as scanners of a light-scanning monitor. The transmitter 42 may emit the light (arrows 43), projecting the light perpendicularly from the input portion 47, and the receiver 44 detects said light. If the user rotates the pen 41 without altering the angle between the pen and the monitor 45, the light 43 falls on other receivers on the monitor 45, or it is determined at the receiver 44 that light from the transmitter 42 is no longer incident. This input signal can be registered and identified as a rotational movement, and once identified, a corresponding rotational movement can be applied to an image that is currently being shown on the monitor 45. In another example, this rotational variant also can be configured using a reflective surface on the input portion 47 and providing a transmitter/receiver on the monitor 45 (or a number of transmitters/receivers around the monitor 45).

Figure 5:
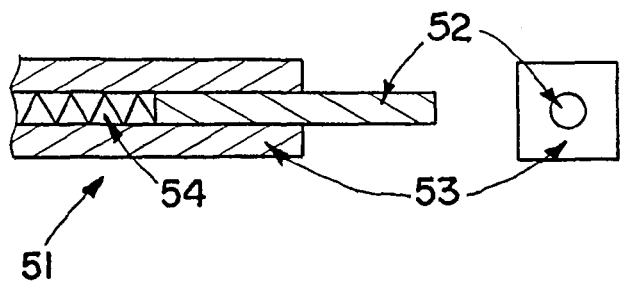
FIG. 5 shows an exemplary input portion of an input pen configured for punctual and planar contact.

FIG. 5 shows another example of an input portion 51 for an input pen in accordance with the invention. The input portion 51 includes a pen extension 52 that is mounted in a casing 53 by a spring 54. In its base state, the pen extension 52 may protrude somewhat beyond the front edge of the casing 53. One-dimensional or punctual inputs can be made using a tip of the pen extension 52. If the input portion 51 is placed onto a monitor with a nominal pressure, the pen extension 52 may be pressed into the casing 53, against the pressure of the spring 54, and a planar input can be made using a resultant overall facing area that includes the facing areas of the casing 53 and the pen extension 52.

Although the invention has been shown and described with respect to a certain preferred embodiment or embodiments, it is obvious that equivalent alterations and modifications will occur to others skilled in the art upon the reading and understanding of this specification and the annexed FIGS. For example, regard to the various functions performed by the above described elements (components, assemblies, devices, software, computer programs, etc.), the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An input pen for a touch-sensitive medical monitor, comprising:
   a grip portion; and
   an input portion configured for contacting a touch sensitive surface, wherein the input portion comprises one-dimensional and two-dimensional monitor contact sections, the one-dimensional and two-dimensional monitor contact sections positionally fixed with respect to each other, and wherein both the one-dimensional and two-dimensional monitor contact sections are arranged on the same input portion.

2. The input pen according to claim 1, wherein said one-dimensional contact section is configured to be punctual or to enable a punctual contact with the monitor.

3. The input pen according to claim 1, wherein said two-dimensional contact section is configured to be linear and/or planar and/or to enable a linear or planar contact with the monitor.

4. The input pen according to claim 1, wherein the input portion comprises the one-dimensional and two-dimensional contact sections at different locations along a contact portion.

5. The input pen according to claim 1, further comprising a sterility barrier arranged between the grip portion and the input portion, said barrier projecting transversely from a longitudinal axis of the pen.

6. An input system comprising:
   a touch-sensitive monitor equipped with a signal receiver; and
   an input pen, comprising a grip portion, a signal emitter, and an input portion configured for contacting a touch sensitive surface, wherein the input portion comprises one-dimensional and two-dimensional monitor contact sections, and wherein both the one-dimensional and two-dimensional monitor contact sections are arranged on the same input portion, and
   wherein said signal receiver is configured to identify changes in the position of the input portion from signals received from the signal emitter.

7. The input system according to claim 6, wherein said changes in position of the input portion are rotational changes made substantially about a longitudinal axis of the pen.

8. The input system according to claim 6, wherein the one-dimensional and two-dimensional monitor contact sections are positionally fixed with respect to each other.

9. The input system according to claim 6, wherein the signal emitter comprises an infrared light emitter, and the signal receiver comprises a light-sensitive element.

10. The input system according to claim 9, wherein the signal receiver further comprises a plurality of infrared light receivers arranged around an edge of the monitor.

11. An input system comprising:
    an input pen, comprising a grip portion, and an input portion configured for contacting a touch sensitive surface, wherein the input portion comprises one-dimensional and two-dimensional monitor contact sections and a reflector, and wherein both the one-dimensional and two-dimensional monitor contact sections are arranged on the same input portion; and
    a touch-sensitive monitor equipped with at least one signal emitter and at least one signal receiver,
    wherein the at least one signal receiver is configured to identify changes in the position of the input portion from signals received from the reflector.

12. The input system according to claim 11, said changes in position of the input portion are rotational changes made substantially about a longitudinal axis of the pen.

13. The input system according to claim 11, wherein the one-dimensional and two-dimensional monitor contact sections are positionally fixed with respect to each other.

14. The input system according to claim 11, wherein the at least one signal emitter comprises an infrared light emitter and the at least one signal receiver comprises a light-sensitive element.

15. The input system according to claim 14, wherein the at least one signal receiver further comprises a plurality of infrared light receivers arranged around an edge of the monitor.

16. An input pen for a touch-sensitive medical monitor, comprising:
    a grip portion; and
    a non-deformable input portion configured for contacting a touch sensitive surface, wherein the input portion comprises one-dimensional and two-dimensional monitor contact sections, and wherein both the one-dimensional and two-dimensional monitor contact sections are arranged on the same input portion.

17. The input pen according to claim 16, wherein a tip of the input portion is configured with a shape that multiplies a number of input options.

* * * * *